3,462,661
Patented Aug. 19, 1969

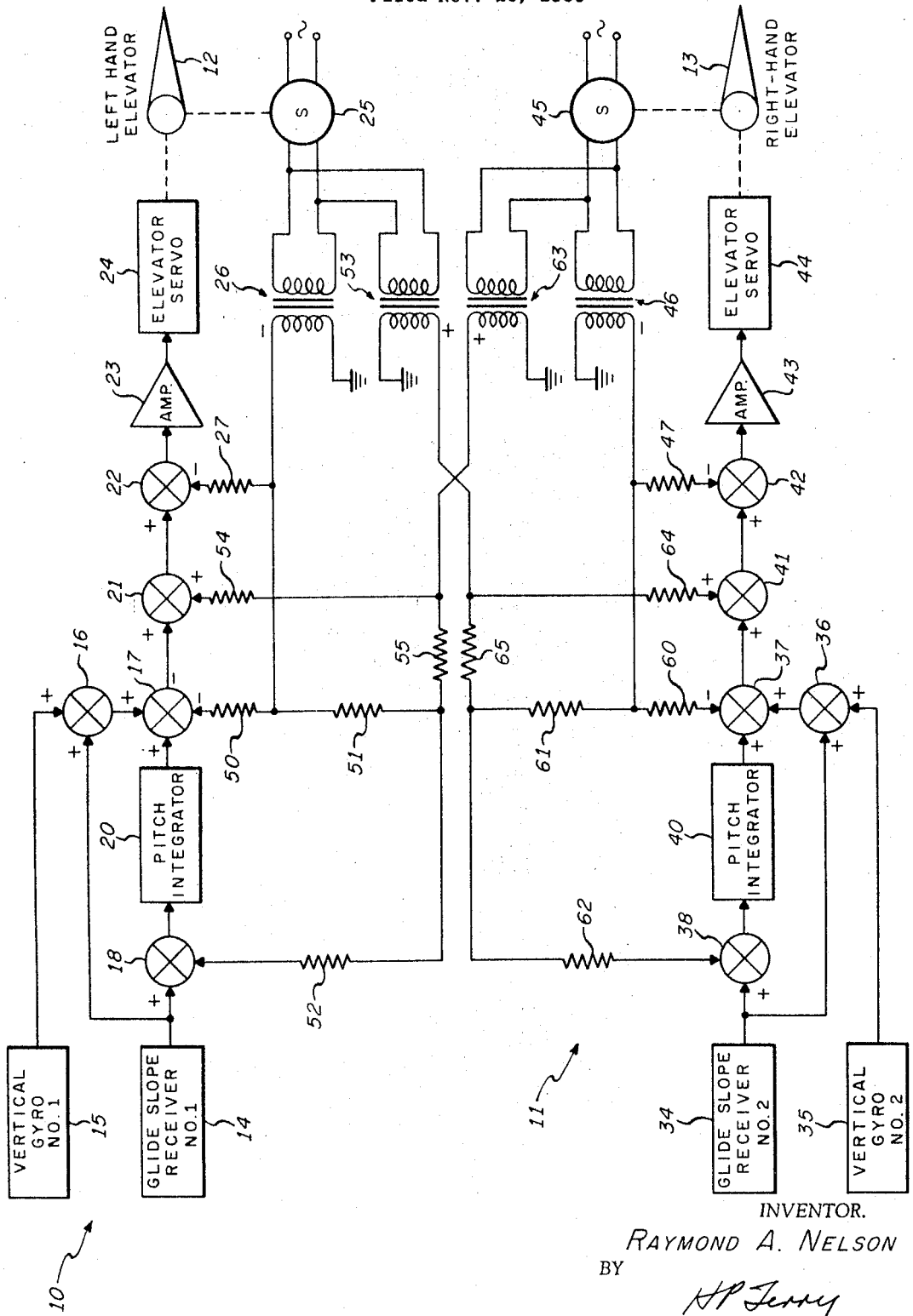

3,462,661
AUTOMATIC CONTROL SYSTEM EQUALIZATION FOR AIRCRAFT
Raymond A. Nelson, Phoenix, Ariz., assignor to Sperry Rand Corporation, a corporation of Delaware
Filed Nov. 25, 1966, Ser. No. 597,060
Int. Cl. G05b 11/01
U.S. Cl. 318—18   5 Claims

ABSTRACT OF THE DISCLOSURE

Apparatus for compensating for the relative difference in the position of independent first and second control surfaces of an aircraft controlled by first and second substantially identical control systems respectively in which the differences in the mechanical and electrical tolerances in each of the control systems tend to cause the control surfaces to be positioned differently with respect to each other in which passive circuit means for providing regenerative and degenerative signals minimize the relative difference between the position of the independent first and second control surfaces.

BACKGROUND OF THE INVENTION

The present invention relates to automatic control systems for aircraft and particularly to systems in which a plurality of independent control channels are operative with respect to a single axis for controlling respective control surfaces.

In one configuration, for example, with respect to the pitch channel, a first pitch control system is operative to control a left-hand elevator surface while a second independent but substantially identical pitch control system is operative control an independent right-hand elevator surface. It is obviously desirable to have the first and second pitch control systems control and position the right and left-hand elevators in exact synchronism. However, because of differences in tolerances of the electrical and mechanical components of each of the dual pitch control systems and their associated sensors, the commands to each of the two independent elevator servo systems which are connected to deflect the respective right and left-hand elevator control surfaces will generally be somewhat different in flight conditions. In the absence of the present invention, the discrepancies between the two elevator positions could result in undesirable flight conditions and in extreme cases to excessive nuisance disengagements thereby requiring manual flight control.

SUMMARY OF THE INVENTION

The present invention provides for synchronized operation of the right- and left-hand elevator control surfaces by equalizing the relative resultant difference in the dual control systems. This is accomplished by sensing the relative positions of the respective aircraft control surfaces and adding additional signal inputs proportional to the difference between the respective positions through an equalizer circuit comprised of passive circuit elements in feedback fashion to compensate for the electrical and mechanical tolerances in the respective control systems. The equalization signals are arranged to command a reduction in the difference between the respective elevator positions in order that they become synchronized. The equalization signals are connected to provide short-term and long-term compensation. The use of passive circuit components in the equalizer circuit provides high reliability and fail-safe operation as well as an inherent limiting function.

It is an object of the present invention to provide for equalization of the control signals of a plurality of control systems actuating a respective plurality of aircraft control surfaces.

It is a further object of the present invention to provide for equalization of the control signals of a plurality of control systems actuating a respective plurality of aircraft control surfaces by means of passive circuit elements.

BRIEF DESCRIPTION OF THE DRAWING

These and other objects of the present invention will become apparent by referring to the single drawing which is an electrical schematic wiring diagram partially in block form illustrating dual pitch control channels actuating respective independent right-hand and left-hand elevator control surfaces and incorporating the equalization feature of the present invention.

DESCRIPTION OF THE PREFERRED EMBODIMENT

The present invention will be described, for purposes of example, with respect to dual pitch control systems each actuating a respective elevator control surface of an aircraft having independent right- and left-hand elevator control surfaces for controlling an aircraft in pitch. It will be appreciated that the present invention is equally applicable for controlling any pair of relatively movable objects where it is desired to have the pairs of movable objects move in unison with respect to each other.

Referring to the drawing, the purpose of the present invention is to compensate for the gain tolerances in each of the dual pitch channels and to minimize the elevator control surface tracking errors with respect to each other. Mathematically, this may be viewed as follows with the "forward path" gain tolerances combined into an equivalent single tolerance of $\pm k$ while the "feedback path" gain tolerances are combined into an equivalent single tolerance of $\pm k$ while the "feedback path" gain tolerances are combined into an equivalent single tolerance of $\pm k'$. Then for the worst case tolerance distribution, it can be shown that $$\frac{\delta_L - \delta_R}{\delta_C} = \frac{2k + k'(1+2K)}{(1-k'^2)(1+2K)}$$

where $\delta_L$ is the deflection of the left-hand elevator control surface, $\delta_R$ is the deflection of the right-hand elevator control surface, $\delta_C$ is the commanded deflection and K is the gain of the equalizer circuit.

Then, if $k' \lll 1$, which is normally the case, the above reduces to $$\frac{\delta_L - \delta_R}{\delta_C} = \frac{2k}{1+2K}$$

Thus, the surface tracking error for a given command is reduced by a factor of $(1+2K)$ when equalization in accordance with the present invention is used.

Referring now to the drawing, the over-all pitch control system includes first and second substantially identical dual pitch control systems 10 and 11 respectively, which independently control the left-hand elevator control surface 12 and the right-hand elevator control surface 13 respectively, except for the equalization circuitry of the present invention. The first pitch control system 10 includes a glide slope receiver 14, for example, which provides signals representative of the displacement of the aircraft with respect to a desired glide slope and a vertical gyroscope 15 which provides signals representative of the pitch attitude of the aircraft. The glide slope displacement signals and the pitch attitude signals are summed in algebraic summation device 16 which in turn is connected to an input terminal of an algebraic device 17. The displacement signal from the glide slope receiver 14 is connected through an algebraic summation device 18 to a pitch integrator 20 which provides an output signal representative of the integral with respect to time of its input signal that in turn is connected to another input terminal of the algebraic summation device 17. The output terminal of the algebraic summation device 17 is connected to an algebraic summation device 21 which in turn is connected to an algebraic summation device 22 and thence to an amplifier 23. The amplified output signal from the amplifier 23 is connected to an elevator servo 24 which may include, for example, an electrohydraulic actuator that is mechanically connected to position the elevator control surface 12 in accordance with the output from the amplifier 23. A position pick-off device 25, such as a synchro, is coupled to the elevator 12 to provide a signal representative of the position of the elevator 12 with respect to a streamline condition. The pick-off 25 has its output coupled to a transformer 26 and a feedback resistor 27 which in turn is connected to an input terminal of the algebraic summation device 22 to provide a degenerative or negative feedback signal in a conventional manner.

The second pitch control system 11 comprises identical elements 34 through 47 connected in an identical manner to independently control the right-hand elevator control surface 13 and a detailed explanation thereof is therefore omitted for purposes of simplicity.

It will be appreciated that utilizing independent control systems 10 and 11 controlling independent elevator control surfaces 12 and 13, respectively, will result usually in the elevator control surfaces 12 and 13 each being commanded to somewhat different positions due to the commands from the sensors and the tolerances in the two independent systems 10 and 11 being slightly different although their individual components are substantially identical.

The present invention tends to equalize the differences in the respective commanded elevator control surface positions and provides for both short-term and long-term compensation to overcome these differences, in a manner as mathematically explained above and to be more fully explained below.

The pick-offs 25 and 45 are energized from synchronized electrical sources to provide synchronization therebetween. The secondary winding of the transformer 26 is coupled through a resistor 50 to an input terminal of the algebraic summation device 17 to provide a signal in opposition to the signals appearing on the other input terminals of the algebraic summation device 17. The secondary winding of the transformer 26 is also coupled through a resistor 51 and a resistor 52 to the other input terminal of the algebraic summation device 18.

In a similar manner, the secondary winding of the transformer 46 is connected through a resistor 60 to an input terminal of the algebraic summation device 37 and through resistors 61 and 62 to the other input terminal of the algebraic summation device 38. To provide signals of opposite phase with respect to those from the transformers 26 and 46, the pick-offs 25 and 45 are also connected to transformers 53 and 63, respectively. The secondary winding of the transformer 53 is connected through a resistor 64 to an input terminal of the algebraic summation device 41 and also through a resistor 65 and the resistor 62 to an input terminal of the algebraic summation device 38. The secondary winding of the transformer 63 is connected through a resistor 54 to an input terminal of the algebraic summation device 21 and also through a resistor 55 and the resistor 52 to an input terminal of the algebraic summation device 18.

In operation, with the dual control systems 10 and 11 each independently endeavoring to position their respective control surfaces 12 and 13, the result may be that the left- and right-hand control surfaces 12 and 13 are not commanded to identical positions because of tolerance variations as explained above. For example, the left-hand elevator 12 may be deflected 5° while the right-hand elevator 13 may be deflected only 3°. The 5° deflection of the left-hand elevator 12 is sensed by the pick-off 25 which provides a signal representative of the 5° deflection. The transformer 53 in response to the pick-off signal provides a positive or regenerative compensation signal via the resistor 64 and the algebraic summation device 41 to the amplifier 43. This provides short-term compensation because it is connected directly to the amplifier input. The output of the amplifier 43 is thus a signal having a magnitude and phase which controls the elevator servo 44 to deflect the right-hand elevator 13 greater than 3°, i.e., towards the 5° position. To provide for long-term compensation, the 5° position signal from the transformer 53 is connected through resistors 65 and 62 to the input of the algebraic summation device 38 and is integrated in the pitch integrator 40 to provide long-term compensation to thence control the elevator servo 44 in a direction to deflect the right-hand elevator towards the 5° position.

Similarly, the pick-off 45 senses the 3° deflection of the right-hand elevator 13 and provides a positive or regenerative signal from the transformer 63 through the resistor 54 to provide short-term compensation via algebraic summation device 21, amplifier 23, and elevator servo 24 to tend to deflect the left-hand elevator 12 toward the 3° deflection position. To provide long-term compensation, the signal from the transformer 63 is connected via resistors 55, 52 and algebraic summation device 18 to the pitch integrator 20. The integrated signal from the pitch integrator 20 is coupled through the amplifier 23 to control the elevator servo 24 to tend to drive the left-hand elevator 12 towards the 3° position. As the left-hand elevator 12 is driven from its 5° position to a 4° deflection and the right-hand elevator 13 is driven from its 3° position to a 4° deflection, it will be seen that the error signals through the respective control systems 10 and 11 approach zero and the elevators 12 and 13 will be equalized by means of the present invention and each maintains a 4° deflection.

Normally, the equilization feature of the present invention will maintain the relative difference between the deflection of the left-hand and right-hand elevators 12 and 13 respectively, within tolerable limits and will maintain them accurately synchronized during steady state conditions. In the event the elevators 12 and 13 become deflected with respect to each other by an amount in excess of that considered desirable, for example, when the difference therebetween exceeds 3°, they can be monitored by means not shown to operate entirely independent of each other, either manually or otherwise, or one of the control systems can be rendered inoperative while the other is connected to control both elevators 12 and 13 simultaneously. When utilizing a monitoring system of the type described immediately above, the equalization feature of the present invention minimizes the necessity for the monitoring function and minimizes nuisance disengagements. This feature is particularly important during approach to a landing when the dual control systems 10 and 11 provide an additional safety factor when operating at low altitude levels immediately preceding a landing.

It will be further appreciated that the use of passive circuit elements such as transformers and resistors in the equalization circuitry provides a high degree of fail-safe protection since the statistical probabilities that this type of circuit element will fail in an off condition are extremely high. Further, it will be appreciated that by using only passive circuit elements such as transformers and resistors in the equalizer circuit that limiting is inherent in the system in that the monitoring system physically limits the elevator difference to a predetermined amount thereby limiting the equalizer signal input to that same amount.

While the invention has been described in its preferred embodiments, it is to be understood that the words which have been used are words of description rather than limitation and that changes within the purview of the appended claims may be made without departing from the true scope and spirit of the invention in its broader aspects.

I claim:
1. Apparatus for compensating for the relative difference in the position of independent first and second control surfaces of an aircraft controlled by first and second substantially identical control systems, respectively, in which the differences in the mechanical and electrical tolerances in each of said control systems tend to cause said control surfaces to be positioned differently with respect to each other, comprising, first and second pick-off means responsive to the position of said first and second control surfaces respectively for providing first and second signals representative of the magnitude and sense of the displacement of said first and second control surfaces respectively from a predetermined condition, first passive circuit means responsive to said first signal and operatively coupled to said second control system for moving said second control surface in a direction and for an amount to minimize the relative difference in the control surface positions, second passive circuit means responsive to said second signal and operatively coupled to said first control system for driving said first control surface in a direction and for an amount to minimize the relative difference in the control surface positions, said first and second passive circuit means providing regenerative signals to said second and first control systems respectively, third passive circuit means responsive to said first signal and operatively coupled to said first control system for providing degenerative signals, and fourth passive circuit means responsive to said second signal and operatively coupled to said second control system for providing degenerative signals.

2. Apparatus of the character recited in claim 1 in which said first passive circuit means includes transformer means responsive to said first signal and first resistive means coupled between said first transformer means and said second control system and said second passive means includes second transformer means responsive to said second signal and second resistive means coupled between said second transformer means and said first control system thereby providing inherent fail-safe operation of said passive circuit means.

3. Apparatus of the character recited in claim 1 in which said first and second passive circuit means are operatively coupled to said first and second control systems, respectively, for providing short-term and long-term compensation to minimize said relative difference and in which said third and fourth passive circuit means are operatively coupled to said first and second control systems, respectively, for providing short and long-term compensation to minimize said relative difference.

4. Apparatus of the character recited in claim 1 in which said first passive circuit means includes first transformer means responsive to said first signal and first resistive means coupled between said first transformer means and said second control system and said second passive circuit means includes second transformer means responsive to said second signal and second resistive means coupled between said second transformer means and said first control system, and said third passive circuit means including third transformer means responsive to said first signal and third resistive means coupled between said third transformer means and said first control system, and said fourth passive circuit means includes fourth transformer means responsive to said second signal and fourth resistive means coupled between said fourth transformer means and said second control system thereby providing inherent fail-safe operation of said passive circuit means.

5. Apparatus of the character recited in claim 4 in which said first control system includes first short-term signal generating means and first long-term signal generating means and said second control channel includes second short-term signal generating means and second long-term signal generating means and said second and third resistive means are coupled to said first short- and long-term signal generating means for providing first short-term and long-term compensation and said first and fourth resistive means are coupled to said second short- and long-term signal generating means for providing second short-term and long-term compensation.

References Cited

UNITED STATES PATENTS

| 2,619,625 | 11/1952 | Willman | 318—19 XR |
| 3,007,657 | 11/1961 | Summerlin | 318—489 XR |
| 3,070,071 | 12/1962 | Cooper | 318—19 XR |
| 3,149,272 | 9/1964 | Dendy | 318—28 |
| 3,270,262 | 8/1966 | Milenkovic et al. | 318—19 |
| 2,801,816 | 8/1957 | Meredith | 318—489 XR |

BENJAMIN DOBECK, Primary Examiner

U.S. Cl. X.R.

318—24